US010373271B2

(12) United States Patent
Feldman et al.

(10) Patent No.: US 10,373,271 B2
(45) Date of Patent: Aug. 6, 2019

(54) RELAXING POLICY RULES FOR REGULATING THE PRESENTATION OF SPONSORED CONTENT TO A USER OF AN ONLINE SYSTEM BASED ON CHARACTERISTICS OF THE USER

(71) Applicant: Facebook, Inc., Menlo Park, CA (US)

(72) Inventors: Matthew Feldman, San Francisco, CA (US); Jonathan Mooser, Mountain View, CA (US); Cassidy Jake Beeve-Morris, San Francisco, CA (US); Halil Bayrak, San Jose, CA (US); Aishwarya Rajagopal, Sunnyvale, CA (US); Shuo Li, Mountain View, CA (US); Leqiang Li, Sunnyvale, CA (US); Zachary Zhang, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 96 days.

(21) Appl. No.: 15/446,779

(22) Filed: Mar. 1, 2017

(65) Prior Publication Data

US 2018/0253800 A1 Sep. 6, 2018

(51) Int. Cl.
*G06Q 30/00* (2012.01)
*G06Q 50/00* (2012.01)
*G06Q 30/02* (2012.01)

(52) U.S. Cl.
CPC ......... *G06Q 50/01* (2013.01); *G06Q 30/0254* (2013.01); *G06Q 30/0269* (2013.01)

(58) Field of Classification Search
CPC ...................................................... G06Q 50/01
USPC ...................................................... 705/14.52
See application file for complete search history.

(56) References Cited

U.S. PATENT DOCUMENTS 8,676,891 B2 * 3/2014 Su .......................... H04W 4/21 709/204
9,530,168 B2 * 12/2016 Ahn ...................... G06Q 10/10
10,007,933 B2 * 6/2018 Simeonov ......... G06F 17/30893
2014/0019261 A1 * 1/2014 Hegeman .............. G06Q 30/02 705/14.71
2014/0067546 A1 * 3/2014 Pike ...................... G06Q 50/01 705/14.66

(Continued)

OTHER PUBLICATIONS

The Daily You, Yale University Press, Turow, 2011, pp. 1-170.*

(Continued)

*Primary Examiner* — Matthew T Sittner
*Assistant Examiner* — Michael I Ezewoko
(74) *Attorney, Agent, or Firm* — Fenwick & West LLP

(57) ABSTRACT

An online system applies content policies regulating presentation of sponsored content to its users. For example, content policies may prevent the presentation of sponsored content items in certain positions content feeds. The online system may relax a content policy when generating a content feed for a user based on characteristics of a user. For example, the online system generates a model determining a tolerance of the user for sponsored content, and relaxes one or more content policies if the tolerance of the user for sponsored content equals or exceeds a threshold. As another example, the online system determines whether to relax one or more content policies based on a comparison of a historical amount of compensation received from the user and an expected amount of compensation from presenting content items violating a content policy.

20 Claims, 4 Drawing Sheets

(56) References Cited

U.S. PATENT DOCUMENTS

2015/0100415 A1* 4/2015 Yu .................... G06Q 30/0251
705/14.49

OTHER PUBLICATIONS

Computing the Mind, Oxford University Press, Edelman, 2008, pp. xi-36.*
Metaphors We Live by, Lakoff, University of Chicago Press, 1980, pp. ix-55.*
Frame Analysis, Goffman, Northeastern University Press, 1974, pp. 1-39, 301-344.*
Algorithms + Data Structures = Programs, 1976, pp. xii-55.*
Noetics, Peter Lang Publishing, Krader, 2010, pp. 551-553.*
Informal Logic, Walton, Cambridge University Press, 2008, pp. 107-117.*
Streetlights and Shadows, MIT Press, 2009, pp. 33-47.*
How Things Shape the Mind, Malfouris, MIT Press, 2013, pp. 57-149.*
Evocative Objects, Turkle, MIT Press, 2007, pp. 224-231.*
The future of the internet—and how to stop It, Yale University Press, 2008, Chapter(s) 1-9, [emphasis pp. 11-18].*
Shamans, Software, and Spleens, Boyle, First Harvard University Press, 1997, pp. 1-16; 119-184 [emphasis: pp. 128-142, 137.*
Patent Failure, Bessen, Princeton University Press, 2008, pp. 73-214 [emphasis p. 85].*
An Inquiry Into the Nature and Causes of the Wealth of Nations, Adam Smith (1776), Random House, 1937, pp. 734-737.*
Reputation Inc.: The Industrialization of Digital Self-Presentation and Online Privacy, Dissertation, Doctor of Philosopy, University of Pennsylvania, 2014, Draper, pp. 1-331.*
Selling Your Self: Online Identity in the Age of a Commodified Internet, University of Washington, Master of Arts, Marwick, 2005, pp. 1-188.*
Status Update (Part I): Celebrity, Publicity and Self-Branding in Web 2.0, Doctor of Philosophy, Steinhardt School of Culture, Education , and Human Development, New York University, , Marwick, 2010, pp. i-191.*
Status Update (Part II): Celebrity, Publicity and Self-Branding in Web 2.0, Doctor of Philosophy, Steinhardt School of Culture, Education , and Human Development, New York University, , Marwick, 2010, pp. 192-497.*
Time to Care About Reputation, Doctor's Thesis, Barrigar, Faculty of Law, University of Ottawa, 2013, pp. 1-255.*
Manufacturing Consent, Pantheon Press, Herman and Chomsky, 1988, pp. 303-304.*

* cited by examiner

RELAXING POLICY RULES FOR REGULATING THE PRESENTATION OF SPONSORED CONTENT TO A USER OF AN ONLINE SYSTEM BASED ON CHARACTERISTICS OF THE USER

BACKGROUND

This disclosure relates generally to online systems, and more specifically to presenting content to an online system user.

An online system, such as a social networking system, allows its users to connect to and to communicate with other users of the online system. Users may create profiles on an online system that are tied to their identities and include information about the users, such as interests and demographic information. The users may be individuals or entities such as corporations or charities. Online systems allow users to easily communicate information and share content with other online system users by providing organic content on an online system for presentation to other users. Organic content posted on an online system includes declarative information provided by a user, such as stories, status updates, and location check-ins, as well as photos, videos, and any other information a user wishes to share with additional users of the online system. An online system may also generate organic content for presentation to a user, such as content describing actions taken by other users on the online system connected to the user.

Additionally, publishing users, such as businesses, may sponsor presentation of content items ("sponsored content") via an online system to gain public attention for the publishing user's products or services or to persuade online system users to take an action regarding the publishing user's products or services. Many online systems receive compensation from a publishing user for presenting online system users with certain types of sponsored content items provided by the publishing user. Frequently, online systems charge a publishing user for each presentation of sponsored content to an online system user (e.g., for each "impression" of sponsored content) or for each interaction with sponsored content by an online system user. For example, an online system receives compensation from a publishing user each time a content item provided by the publishing user is displayed to a user on the online system or each time a user is presented with a content item provided by the publishing user via the online system and the user interacts with the content item (e.g., clicks on a link included in the content item) or performs another action after being presented with the content item.

Online systems commonly present a user with feeds of content that include both sponsored and organic content selected for presentation to a user by the online system based on measures of relevance to the user. For example, an online system presents a user with a newsfeed that includes organic content describing actions taken by other users connected to the user on the online system and sponsored content selected for the user based on declared interests of the user. However, in certain circumstances, presenting sponsored and organic content together in the same feed of content may impair a user's experience with the feed, which reduces the likelihood of the user interacting with the feed or with individual content items presented in the feed. For example, placing multiple sponsored content items in positions of a feed that are within a threshold distance of each other may frustrate a user primarily interested in viewing organic content items in the feed.

To encourage user interaction with presented content, online systems commonly apply policy rules regulating presentation of sponsored content to their users. For example, policies applied by an online system prevent presentation of sponsored content in certain positions in a feed of content to prevent a user from becoming overwhelmed with the sponsored content. However, conventional methods for online systems to apply policies do not account for certain circumstances where it may be advantageous to present sponsored content to a user in positions of a feed of content that would violate a policy applied by the online system. For example, conventional application of policies by an online system prevent presentation of sponsored content in positions of a feed presented to a user that would violate a policy of the online system even when presenting the sponsored content in the positions would increase a likelihood of the user interacting with the feed. As a result, conventional application of policies regulating presentation of sponsored content to online system users may reduce the likelihood of a user interacting with a feed of content or with individual content items presented in a feed of content in some circumstances.

SUMMARY

To increase user interaction with content, an online system applies one or more content policies to regulate the presentation of sponsored content items to its users. Content policies may prevent the presentation of sponsored content items in certain positions in feeds of content (or "content feeds") that also include organic content, which is content for which the online system does not receive compensation in exchange for presenting to its users. For example, one or more content policies prevent presentation of sponsored content items in certain positions of the feed of content (e.g., in an initial position in the feed of content). As another example, one or more content policies specify a minimum distance between sponsored content items presented in a feed of content; a content policy may specify a minimum number of organic content items presented between sponsored content items in the feed or may specify a minimum number of positions between sponsored content items in the feed. In certain circumstances, the online system may relax one or more content policies regulating presentation of a sponsored content item to a user, allowing the sponsored content item to be presented to the user in a position in a feed of content that would otherwise violate a content policy applied by the online system.

When generating a feed of content for presentation to a user, the online system relaxes one or more content policies for sponsored content items satisfying at least a threshold number of criteria (e.g., a threshold amount of compensation received by the online system for presenting a sponsored content item, a threshold similarity of the sponsored content item to one or more sponsored content items previously presented to the user, or a threshold likelihood of the user interacting with the sponsored content item). In one embodiment, the online system calculates a value associated with presenting a sponsored content item in the feed based on a bid amount associated with the sponsored content item (e.g., a specified amount of compensation received by the online system in exchange for presenting the sponsored content item to the user) and an estimated amount of interaction with the sponsored content item by the user. If the value satisfies one or more conditions (e.g., equals or exceeds a threshold value or has at least a threshold position in a ranking of values associated with sponsored content items previously presented to the user), the online system may relax one or more content policies regulating placement of the sponsored content item in one or more positions in the feed when generating the feed for presentation to the user. In various embodiments, the calculated values may be based on amounts of revenue received or expected to be received by the online system for presenting sponsored content items to the user and/or amounts of or predicted amounts of user interaction with sponsored content items or other content items presented to the user.

If the online system relaxes one or more content policies for a sponsored content item when generating the feed of content, the online system computes a penalty incurred by the sponsored content item for violating one or more of the content policies that are relaxed. The penalty may be based on prior interactions by the user with sponsored content items previously presented to the user, such as sponsored content items having at least a threshold percentage or threshold number of characteristics matching characteristics of the sponsored content item. In some embodiments, the penalty is based at least in part on a difference between user interaction with feeds of content including sponsored content items with at least the threshold number or percentage of characteristics matching characteristics of the sponsored content item and user interaction with feeds of content not including sponsored content items. Alternatively, the penalty is based on a distribution of revenue received by the online system from presenting a set of sponsored content items having at least a threshold number or percentage of characteristics matching or similar to characteristics of the sponsored content item and a coefficient associated with a subset of the distribution (e.g., a specified percentile of the distribution). Additionally, the penalty may be based on a degree to which presenting the sponsored content item in a position of the feed violates the content policies. In some embodiments, the penalty is inversely related (e.g., inversely proportional) to the frequency with which the online system allows violation of a content policy when generating feeds of content for presentation to users.

The online system may relax one or more content policies when presenting content to a user based on characteristics of the user. In one embodiment, the online system generates a model for the user that predicts the user's tolerance for sponsored content in a feed of content generated for the user. For example, the online system presents surveys to a set of users prompting users of the set to identify preferences between content items. As an example, a survey presented to a user of the set presents a content item and an alternative content item and prompts the user of the set to indicate a preference for the content item or the alternative content item. Based on indications of preference received from users of the set and corresponding characteristics of user of the set from whom indications of preference were received, the online system generates a model determining a value indicating a tolerance for sponsored content in a feed of content. In addition to indications of preference received from users to whom the survey was presented, the model may use additional information. For example, a historical rate at which the user performed one or more actions with content items previously presented to the user and characteristics of the previously presented content items with which the user interacted are also used by the model.

When generating a feed of content for the user, the online system applies the model to characteristics of the user and determines a minimum number of organic content items presented between sponsored content items in the feed or a minimum number of positions between sponsored content items in the feed based on the value indicating the user's tolerance for sponsored content generated by the model, or otherwise determines a content policy to enforce when generating the feed of content for the user. In some embodiments, the online system applies the model to additional users having at least a threshold amount of characteristics matching characteristics of the user, and ranks the value generated by the model for the user relative to values generated by the model for the additional user. The online system maintains a mapping between different positions in the ranking to different minimum numbers of organic content items or minimum numbers of positions between sponsored content items in a feed of content items. Hence, the online system determines the minimum number of organic content items or minimum number of positions between sponsored content items in the feed of content for the user based on the mapping. For example, the online system maps different minimum numbers of organic content items or positions between sponsored content items in the feed of content with different percentiles of the values generated by the model for the additional user. The online system determines a percentile including the value generated by the model for the user and selects a minimum number of organic content items or positions between sponsored content items in a feed of content items for the user that is mapped to the percentile including the value generated by the model for the user.

In various embodiments, the online system determines a value of a candidate feed of content that presents the sponsored content item in a position that violates a content policy and also determines an additional value of an alternative candidate feed of content that presents the sponsored content item in a position that does not violate the content policy. When determining the value of the candidate feed that presents the sponsored content item in the position that violates the content policy, the online system reduces the bid amount of the sponsored content item by the penalty. Additionally, the online system applies various position discounts to the sponsored content items and other content items included in the candidate feed based on the positions in the candidate feed in which the sponsored content item and other content items are presented. Accounting for the penalty allows the online system to account for a potential decrease in user interaction from presenting the sponsored content item in a position of the candidate feed that violates the content policy. Similarly, position discounts based on positions in the alternative candidate feed in which content items or sponsored content items are presented in the alternative candidate feed are used when determining the additional value. Hence, the value of the candidate feed and the additional value of the additional candidate feed are based at least in part on an expected amount of interaction with the candidate feed and with the additional candidate feed, respectively, by the user. The online system compares the value and the additional value and presents the candidate feed or the alternative candidate feed to the user based on the comparison. For example, the online system identifies a greater of the value and the additional value and presents the candidate feed or the alternative candidate feed associated with the greater of the value and the additional value.

In other embodiments, the online system identifies sponsored content items eligible to be presented to the user and determines a number of sponsored content items included in the feed of content that complies with a content policy enforced by the online system. From the sponsored content items eligible to be presented to the user, the online system selects an alternative number of sponsored content items that exceeds the number of sponsored content items complying with the content policy. For example, the online system ranks the sponsored content items eligible be presented to the user based on expected values of the sponsored content items and selects the alternative number of sponsored content items based on the ranking. As an example, the alternative number of sponsored content items is six, so the online system selects sponsored content items having the top six positions in the ranking based on expected values.

The online system determines an average value to the online system for presenting the alternative number of sponsored content items in the feed of content based on the expected values of the selected sponsored content items. Additionally, the online system determines a historical average amount of compensation received from the user based on sponsored content items previously presented to the user by the online system. For example, the online system determines amounts of compensation received from presenting sponsored content items to the user within a specific time interval and determines an average amount of compensation based on the total amount of compensation received from presenting sponsored content items during the specific time interval and a number of sponsored content items presented to the user within the specific time interval. Based on a comparison of the average value to the online system for presenting the alternative number of sponsored content items in the feed of content and the historical average amount of compensation received from the user, the online system determines whether to relax the content policy. For example, the online system determines a ratio of the average value to the online system for presenting the alternative number of sponsored content items in the feed of content to the historical average amount of compensation received from the user; if the ratio exceeds a threshold, the online system relaxes the content policy and includes the alternative number of sponsored content items, which exceeds the number of content items that complies with the content policy. As an example, if the ratio exceeds the threshold, the online system decreases a number of organic content items or a number of positions separating sponsored content items in the feed of content generated for the user.

As another example, the online system generates a model determining a likelihood that the user will quit the online system based on characteristics of the user and characteristics of feeds of content presented to the online system. For example, the online system generates the model based on characteristics of other users who quit the online system, amounts of sponsored content included in feeds of content presented to the other users, characteristics of feeds of content presented to the other users (e.g., separation between sponsored content items included in feeds of content, positions of sponsored content within the feeds of content, etc.). The online system applies the model to characteristics of the user and characteristics of a generated candidate feed of content that complies with one or more content policies enforced by the online system. If the likelihood of the user quitting the online system generated by application of the model is less than a threshold value, the online system relaxes one or more of the content policies to increase a number of sponsored content items included in the feed of content generated for the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
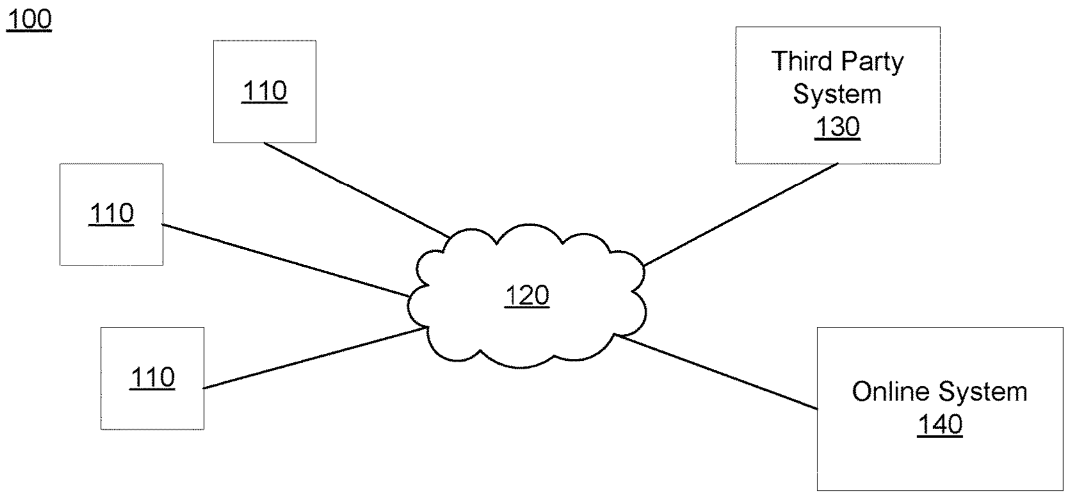
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as sponsored content items, other content, or information about an application provided by the third party system 130.

In some embodiments, one or more of the third party systems 130 provide content to the online system 140 for presentation to users of the online system and provide compensation to the online system 140 in exchange for presenting the content. For example, a third party system 130 provides sponsored content items, which are further described below in conjunction with FIG. 2, including content for presentation and amounts of compensation to the online system 140 by the third party system 130 for presenting the sponsored content items. Various types of sponsored content may be provided by a third party system 130 to the online system 140 for presentation by the online system 140 in exchange for compensation from the third party system 130. Sponsored content from a third party system 130 may be associated with the third party system 130 or with an entity on whose behalf the third party system 130 operates.

Figure 2:
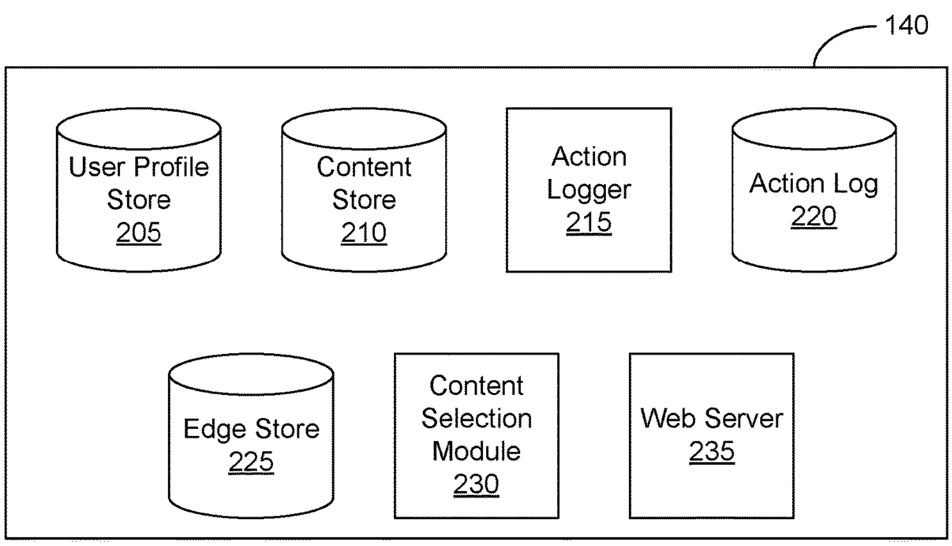
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 are sponsored content items that include a creative, which is content for presentation to a user, and a bid amount. The creative is text, image, audio, video, or any other suitable data presented to a user. In various embodiments, the creative also specifies a page of content. For example, a sponsored content item includes a landing page specifying a network address of a page of content to which a user is directed when the sponsored content item is accessed. The bid amount is included in a sponsored content item by a publishing user providing the sponsored content item to the online system 140 and is used to determine an expected value, such as monetary compensation, provided by the publishing user to the online system 140 if content in the sponsored content item is presented to a user, if the content in the sponsored content item receives a user interaction when presented, or if any suitable condition is satisfied when content in the sponsored content item is presented to a user. For example, the bid amount included in a sponsored content item specifies a monetary amount that the online system 140 receives from a user who provided the content item to the online system 140 if content in the sponsored content item is displayed. In some embodiments, the expected value to the online system 140 of presenting the content from the sponsored content item may be determined by multiplying the bid amount by a probability of the content of the content item being accessed by a user.

Various content items, such as sponsored content items, may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item, such as a sponsored content item, may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements or other content with which the user engaged, purchases made, and other patterns from shopping and buying. Hence, the action log 220 may include information identifying content provided by one or more third party systems 130 that a user of the online system 140 has accessed or content provided by one or more third party systems 130 with which the user of the online system 140 otherwise interacted. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items that are not associated with bid amounts, such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items When generating a feed of content items for presentation to a user of the online system 140, the content selection module 230 may place content items into positions in the feed of content subject to one or more content policies that restrict certain content items from being presented in specified positions in feeds of content. For example, a content policy prevents presentation of sponsored content in certain positions of a content feed (e.g., a first or top position in the feed). However, the content selection module 230 may relax or ignore one or more of the content policies for content items satisfying a threshold number of criteria. For example, the content selection module 230 generates a content feed including a sponsored content item in a position that violates a content policy if a value associated with presenting the sponsored content item in the position exceeds a threshold value.

The value associated with presenting a sponsored content item may be associated with the sponsored content item itself (e.g., a bid amount associated with the sponsored content item) or with the content feed in which the sponsored content item will be presented (e.g., an engagement score indicating an amount of user interaction with the content feed). In various embodiments, the value of the sponsored content item is adjusted by a penalty computed by the online system 140 for violating a content policy. The threshold value to which the value associated with presenting the sponsored content item may be based on a predicted amount of user interaction with the sponsored content item and/or content feed including the sponsored content item, an amount of compensation expected to be received by the online system 140 for presenting the sponsored content item to the user, an amount of compensation received by the online system 140 for presenting other sponsored content items to the user, a similarity of the sponsored content item to one or more sponsored content items previously presented to the user, or a likelihood of the user interacting with the sponsored content item and/or content feed including the sponsored content item.

The content selection module 230 may also relax one or more content policies when presenting content to a user based on characteristics of the user. In one embodiment, the content selection module 230 generates a model for the user that predicts the user's tolerance for sponsored content in a feed of content generated for the user based on indications of preference for content items received from the user or from other users. In addition to received indications of preference for content items, the model may use additional information, such as a historical rate at which the user performed one or more actions with content items previously presented to the user and characteristics of the previously presented content items with which the user interacted are also used by the model. The content selection module 230 applies the model to characteristics of a user and determines whether to relax one or more content policies based on a value indicating the user's tolerance for sponsored content generated by the model, as further described below in conjunction with FIGS. 3-5.

In other embodiments, the content selection module 230 identifies sponsored content items eligible to be presented to the user and determines a number of sponsored content items included in the feed of content generated for the user that complies with a content policy enforced by the content selection module 230. From the sponsored content items eligible to be presented to the user, the content selection module 230 selects an alternative number of sponsored content items that exceeds the number of sponsored content items complying with the content policy. From expected values for the selected alternative number of sponsored content items, the content selection module 230 determines an average value for presenting the alternative number of sponsored content items in the feed of contents. The content selection module 230 also determines a historical average amount of compensation received from the user based on sponsored content items previously presented to the user by the online system 140. For example, the content selection module 230 determines amounts of compensation received from presenting sponsored content items to the user within a specific time interval and determines an average amount of compensation based on the total amount of compensation received from presenting sponsored content items during the specific time interval and a number of sponsored content items presented to the user within the specific time interval. Based on a comparison of the average value to the online system 140 for presenting the alternative number of sponsored content items in the feed of content and the historical average amount of compensation received from the user, the content selection module 230 determines whether to relax the content policy.

As another example, the content selection module 230 generates a model determining a likelihood that the user will quit the online system 140 based on characteristics of the user and characteristics of feeds of content presented to the online system. The content selection module 230 applies the model to characteristics of the user and to characteristics of a generated candidate feed of content that complies with one or more content policies enforced by the content selection module. If the likelihood of the user quitting the online system 140 generated by the model is less than a threshold value, the content selection module relaxes one or more of the content policies when generating the feed of content, increasing a number of sponsored content items in the feed relative to the number of sponsored content items in the candidate feed. Relaxing one or more content policies is further described below in conjunction with FIGS. 3-5.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
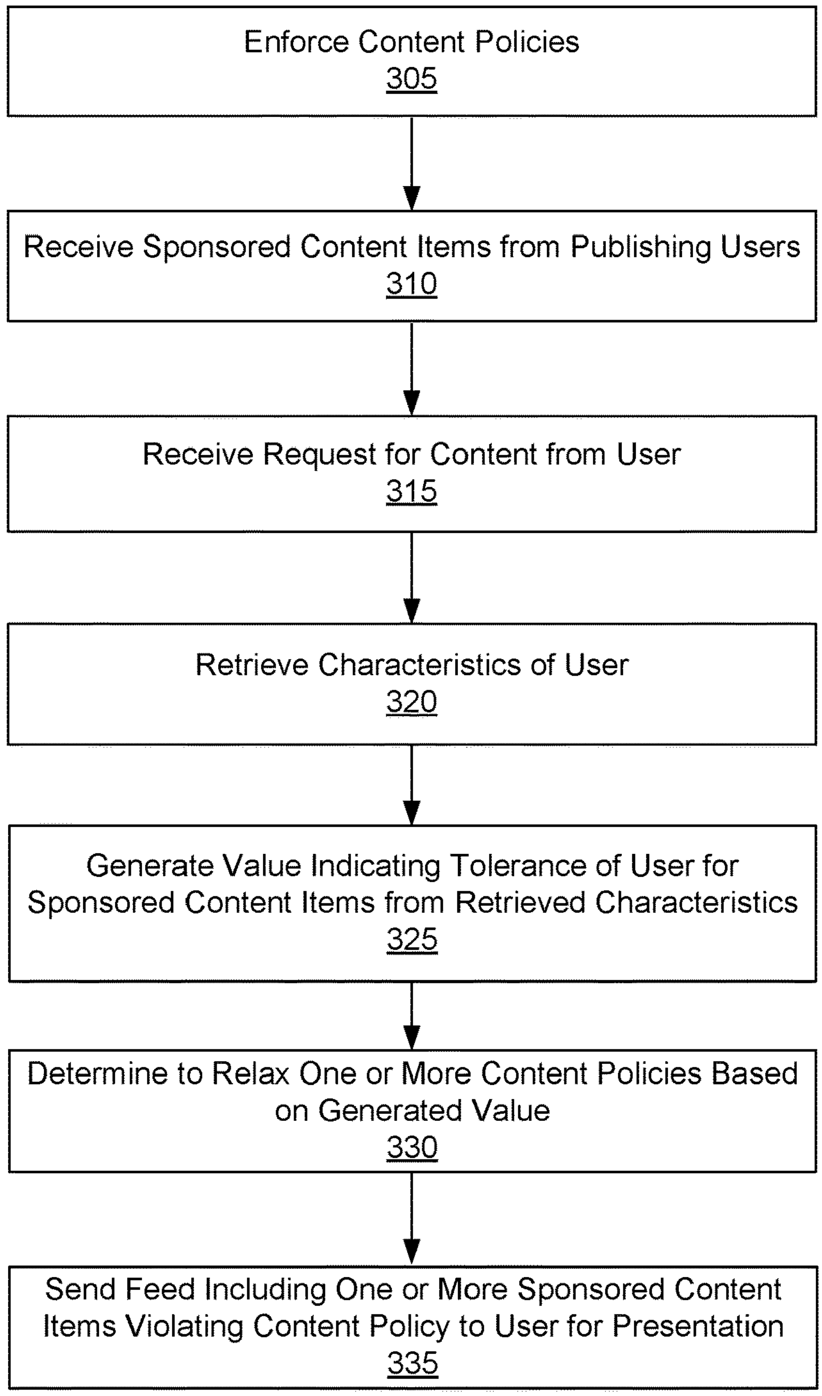
FIG. 3 is a flowchart of a method for relaxing one or more content policies regulating the presentation of sponsored content to a user of an online system, in accordance with an embodiment.

Relaxing Content Policies Regulating Presentation of Sponsored Content to a User FIG. 3 is a flowchart of one embodiment of a method for relaxing one or more content policies regulating presentation of sponsored content to a user of an online system 140. In other embodiments, the method may include different and/or additional steps than those shown in FIG. 3. Additionally, steps of the method may be performed in different orders than the order described in conjunction with FIG. 3 in various embodiments.

The online system 140 enforces 305 one or more content policies that regulate the presentation of sponsored content items to its users to improve engagement with the online system 140 and to increase the likelihood of users interacting with feeds of content (also referred to as "content feeds") presented by the online system 140. Content policies enforced 305 by the online system 140 describe one or more conditions preventing presentation of sponsored content in certain positions in feeds of content, such as feeds of content that also include organic content. For example, one or more content policies prevent presentation of sponsored content items in certain positions of a feed of content presented to a user (e.g., a first or an initial position in the feed of content). If the online system 140 generates a vertically-scrollable content feed including a single column and multiple rows that each correspond to a position in which one or more content items are presented, the online system 140 enforces 305 the prior example content policy to prevent presentation of a sponsored content item in the top row (i.e., the initial position) of the content feed. This content policy causes a content item for which the online system 140 does not receive compensation in exchange for presenting to a user (i.e., an "organic content item") to be presented in the initial position of the content item, which may increase a likelihood of the user interacting with the content feed.

In another example, one or more content policies specify a threshold distance between sponsored content items presented in a feed of content. The threshold distance may be identified as a number of positions between sponsored content items, a number of organic content items presented between sponsored content items, a number of pixels between sponsored content items, or any other suitable unit of measurement separating sponsored content items. For example, a content policy specifies a minimum number of positions in a content feed between sponsored content items presented in the feed. If the online system 140 generates a vertically-scrollable content feed including a single column of multiple rows that each correspond to a position in which one or more content items are presented, enforcing 305 the one or more content policies causes the online system 140 to prevent sponsored content items from being presented in positions that are within the specified minimum number of positions from each other.

As another example, a content policy specifies a minimum number of organic content items presented between sponsored content items in a content feed. If the online system 140 generates a content feed including a single column of multiple rows that each correspond to a position in which one or more content items are presented to a user, the online system 140 enforces 305 the content policy to prevent presentation of a sponsored content item in a position in the feed that is not separated from a position in the feed presenting another sponsored content item in the feed by at least the specified number of organic content items. As multiple content items may be presented in a single position in a feed of content in some embodiments or a content item may be presented using multiple positions in the feed of content in other embodiments, the number of positions and the number of content items between sponsored content items presented in a feed of content may differ in certain embodiments.

Additionally, one or more content policies may prevent presentation of sponsored content in portions of a content feed that have at least a threshold visibility or at least a threshold likelihood of receiving user interaction. For example, if the online system 140 determines that the first five positions in a feed of content are likely to receive at least threshold amount of user interaction, an content policy prevents presentation of a sponsored content item in the first five positions of the feed of content to increase the likelihood of the user interacting with organic content items when enforced 305 by the online system 140. As another example, a content policy prevents presentation of a sponsored content item in a position of a content feed having at least a threshold prominence or visibility to a user when presented on a client device 110. For example, a content policy specifies a minimum distance from a reference position in the feed of content item having a maximum prominence when presented on a client device 110 (e.g., a reference position in a particular region of a display device of the client device 110). When the online system 140 enforces 305 the content policy in the preceding example, a content feed generated by the online system 140 does not include sponsored content items in positions of the content feed that are less than the minimum distance from the reference position when the content item is initially presented to a user. However, user interaction with the content feed (e.g., scrolling the content feed) may cause a position in which a sponsored content item is presented to be within the minimum distance from the reference position after initial presentation of the content feed.

The online system 140 receives 310 sponsored content items from one or more publishing users, each sponsored content item including content for presentation to users and a bid amount. Additionally, one or more of the sponsored content items may include one or more targeting criteria specified by the publishing user that identify identifying users eligible to be presented with the one or more sponsored content items. As further described above in conjunction with FIG. 2, the bid amount included in a sponsored content item specifies an amount of compensation provided by the publishing user from whom the ad request was received 310 to the online system 140 if the sponsored content item is presented to one or more online system users or if one or more online system users perform one or more specific interactions when presented with the sponsored content item. Additionally, a sponsored content item may have additional characteristics, such as an identifier of a campaign including multiple sponsored content items, a description of the content of the sponsored content item, a landing page associated with the sponsored content item, and one or more topics associated with the sponsored content item. The online system 140 stores the sponsored content items for subsequent retrieval.

The online system 140 receives 315 a request to present a feed of content including a plurality of content items to a user of the online system 140. For example, the online system 140 receives 315 a request from a client device 110 associated with a user of the online system 140 to present a feed of content (e.g., organic content items describing actions taken by additional users connected to the user on the online system 140, content provided to the online system 140 by additional users of the online system 140). As another example, the online system 140 receives 315 a request from a client device 110 associated with the user to refresh a feed of content provided by the online system 140 to the client device 110. In response to receiving 315 the request, the online system 140 selects content items for presentation to the user. For example, the online system 140 selects organic content items and sponsored content items eligible for presentation to the user and selects content from the organic content items and sponsored content items eligible for presentation to the use based on attributes of the content items and characteristics of the user, as further described above in conjunction with FIG. 2.

Organic content items are content items for which the online system 140 does not receive compensation in exchange for presenting to the user. As described above in conjunction with FIG. 2, organic content items may be selected for presentation to the user based on measures of relevance to the user, which may be based at least in part on engagement scores specifying amounts of predicted interaction with the content item by the user. In some embodiments, engagement scores may be based on a historical number of interactions with a content item by various users of the online system 140 (e.g., all users of the online system 140, users of the online system 140 having specific characteristics, or users of the online system 140 having a threshold similarity to the user from which the request for content was received 315). Sponsored content items are content items for which the online system 140 receives compensation from publishing users providing the sponsored content items to the online system 140 in exchange for presenting the sponsored content items to a user. As described above in conjunction with FIG. 2, the online system 140 may select sponsored content items for presentation to the user based at least in part on bid amounts associated with the sponsored content items, and may account for engagement scores associated with various sponsored content items that are based on a likelihood of the user interacting with the sponsored content items.

After selecting the plurality of content items, including one or more sponsored content items, for presentation to the user, the online system 140 generates a candidate feed of content including a plurality of positions, with one or more of the selected content items included in each of the positions. When generating the candidate feed of content, the online system 140 associates one or more of the selected content items with each position in the candidate feed based on values associated with content items, which include sponsored content items, and position discounts associated with positions in the candidate feed. In some embodiments, the online system 140 associates minimum values with certain positions, so content items having values less than a minimum value associated with a position are not associated with the position in the candidate feed. When associating sponsored content items with positions in the candidate feed, the online system 140 accounts for one or more content policies enforced 305 by the online system 140. For example, enforcement of one or more content policies prevents sponsored content items from being associated with certain positions in the candidate feed. In addition to enforcing 305 one or more content policies, the online system 140 also determines whether a sponsored content item selected for presentation to the user satisfies a threshold number of criteria causing the online system 140 to relax one or more of the content policies and determines whether one or more characteristics of the user cause the online system 140 to relax one or more of the content polices. If the sponsored content item satisfies at least the threshold number of criteria, the online system 140 may associate the sponsored content item with a position in the candidate feed that violates one or more of the relaxed content policies and computes a value associated with presenting the candidate feed including the sponsored content item in the position that violates one or more of the relaxed content policies to the user.

Figure 4:
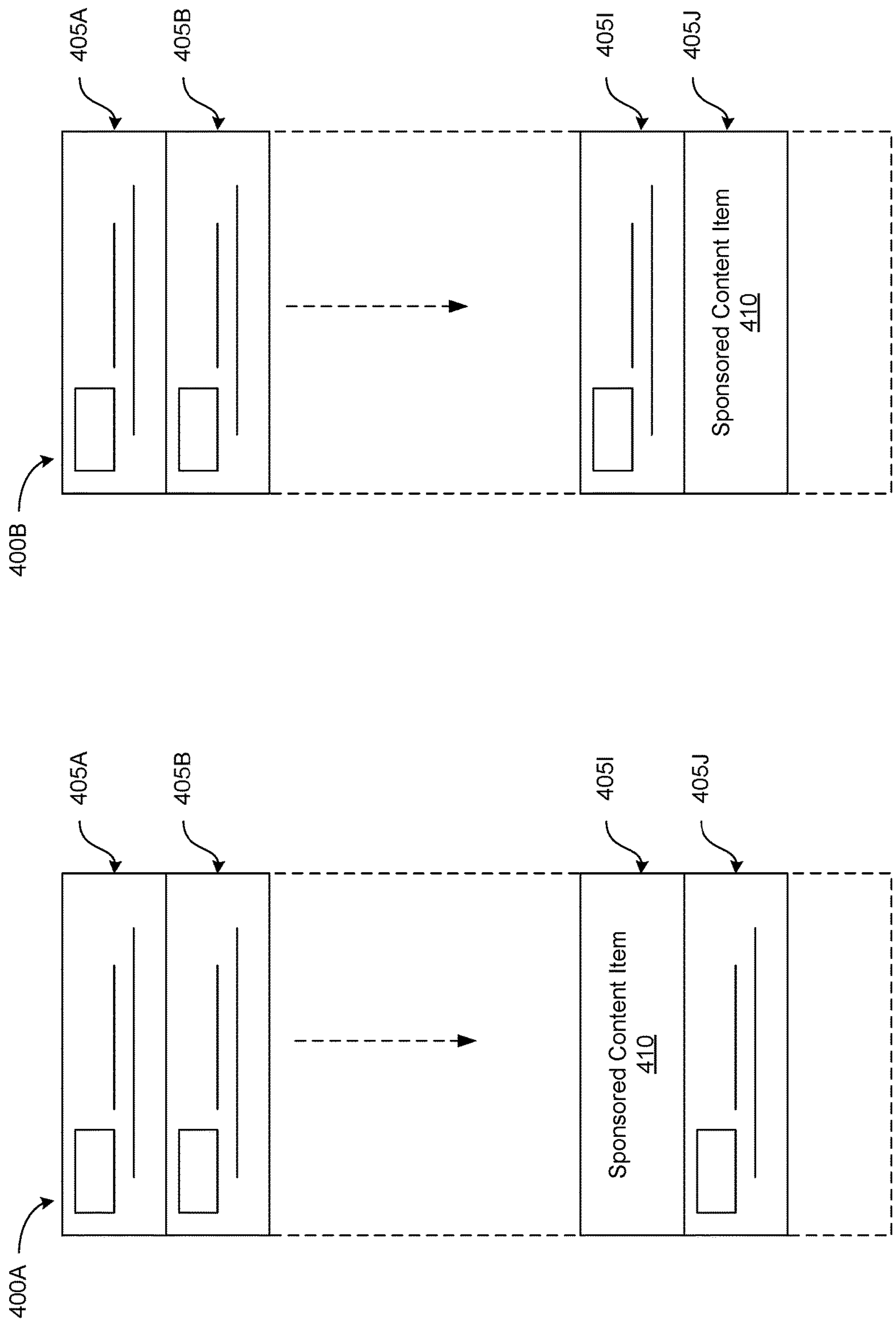
FIG. 4 is an example of a candidate feed of content including a sponsored content item in a position that violates a content policy and an alternative candidate feed of content including the sponsored content item in a position that complies with the content policy, in accordance with an embodiment.

Referring to FIG. 4, the online system 140 generates a candidate feed of content 400A including a plurality of positions 405A-J that each present one or more content items to a user. Hence, each position 405A-J in the candidate feed 400A is associated with one or more content items selected for presentation to the user. In the example of FIG. 4, a sponsored content item 410 satisfies at least a threshold number of criteria or characteristics of the user result in a tolerance for sponsored content equaling or exceeding a threshold, so the online system 140 associates the sponsored content item 410 with a position 405I in the candidate feed of content 400A that violates one or more content policies enforced 305 by the online system 140. For example, the online system 140 enforces 305 a content policy preventing presentation of one or more sponsored content items in the first nine positions of a feed of content that includes organic content. When generating the candidate feed of content 400A, the online system 140 associates one or more content items with each position 405A-J of the candidate feed 400A based on one or more criteria. In the example of FIG. 4, if a sponsored content item eligible to be presented to the user satisfies criteria for association with one of the first nine positions 405A-I, the online system 140 determines whether the sponsored content item satisfies at least a threshold number or a threshold percentage of criteria for relaxing the content policy or determines whether characteristics of the user satisfy criteria for relaxing the content policy.

Example criteria for relaxing one or more content policies enforced 305 by the online system 140 include: a threshold amount of compensation received by or expected to be received by the online system 140 for presenting the sponsored content item 410 to the user, a threshold position in a ranking of amounts of revenue received by the online system 140 for presenting a set of sponsored content items to the user, a threshold position in a ranking of expected amounts of revenue received by the online system 140 for presenting other sponsored content items to the user, a threshold measure of similarity between the sponsored content item 410 and one or more sponsored content items previously presented to the user, and a threshold likelihood of the user interacting with the sponsored content item 410. If the online system 140 determines the sponsored content item 410 satisfies a threshold number or a threshold percentage of criteria for relaxing one or more content policies enforced 305 by the online system 140, the sponsored content item 410 may be associated with one of the positions 405A-I in the candidate feed of content 400A that would otherwise violate an content policy.

Additionally or alternatively, the online system 140 retrieves 320 characteristics of the user maintained by the online system 140 and determines whether to relax one or more content policies enforced 305 by the online system 140 based on the retrieved characteristics. From the retrieved characteristics, the online system 140 generates 325 a value indicating a tolerance of the user for sponsored content items included in a feed of content. In one embodiment, the online system 140 generates a model for the user that predicts the user's tolerance for sponsored content in a feed of content. For example, the online system 140 presents surveys to the user that prompts the user to identify preferences between content items. As an example, a survey presented to the user of the set presents a content item and an alternative content item to the user and prompts the user indicate a preference for the content item or for the alternative content item. Surveys presented to the user may prompt to user to indicate a preference for a presented organic content item or for a presented sponsored content item. Based on indications of preference received from the user, the online system 140 generates a model determining a value indicating a tolerance of the user for sponsored content in a feed of content. Other information about the user may also be used by the model to determine the value. For example, the online system 140 retrieves stored information describing sponsored content items presented to the user and actions by the user with the sponsored content items and determines a historical rate at which the user performed one or more actions with the previously presented sponsored content items.

Alternatively, the online system 140 identifies a set of users and prompts users of the set to identify preferences between content items. For example, the online system 140 identifies the set as users having at least a threshold amount of characteristics matching characteristics of the user or identifies the set as users having a particular characteristic matching the particular characteristic of the user. As described above, the online system 140 may present surveys to users of the set to obtain indications of preference for content items from users of the set. For example, a survey presented to a user of the set presents a content item and an alternative content item and prompts the user of the set to indicate a preference for the content item or for the alternative content item. Based on indications of preference received from users of the set and corresponding characteristics of user of the set from whom indications of preference were received, the online system 140 generates the model determining the value indicating a tolerance for sponsored content in a feed of content. The online system 140 generates the model based on indications of preference from the user, indications of preference from the users of the set, and other information. For example, the online system 140 determines the historical rate at which the user performed one or more actions with previously presented sponsored content items, as described above, determines historical rates at which users of the set performed one or more actions with previously presented sponsored content items, and generates the model based on the received indications of preference from the user and the users of the set as well as the historical rates determines for the user and for users of the set.

When generating the candidate feed of content for the user, the online system 140 applies the model to characteristics of the user and determines whether to relax one or more content policies enforced 305 by the online system based on the value generated by the model indicating the user's tolerance for sponsored content generated by the model. For example, the online system 140 determines whether to relax a content policy specifying a minimum number of organic content items presented between sponsored content items in the feed or specifying a minimum number of positions between sponsored content items in the feed based on the value indicating the user's tolerance for sponsored content generated by the model. In some embodiments, the online system 140 applies the model to additional users having at least a threshold amount of characteristics matching characteristics of the user, and ranks the value generated by the model for the user relative to values generated by the model for the additional users. For example, the online system 140 applies the model to additional users associated with a location that is also associated with the user and ranks the value generated by the model for the user relative to values generated by the model of the additional users associated with the location associated with the user. The online system 140 maintains a mapping between different positions in the ranking to different minimum numbers of organic content items or minimum numbers of positions between sponsored content items in a feed of content items. For example, the online system 140 maps different minimum numbers of organic content items or positions between sponsored content items in the feed of content to different percentiles of the values generated by the model for the additional users. The online system 140 determines a percentile that includes the value generated by the model for the user and selects a minimum number of organic content items or positions between sponsored content items in a feed of content items for the user mapped to the determined percentile including the value generated by the model for the user.

In other embodiments to determine whether to relax one or more of the content policies when generating the candidate feed of content, the online system 140 determines a number of sponsored content items included in the candidate feed that complies with one or more of the enforced content policies. The online system 140 determines an alternative number of sponsored content items that exceeds the number of sponsored content items that complies with one or more of the enforced content policies. From sponsored content items eligible to be presented to the user, the online system 140 selects the alternative number of sponsored content items and determines an average expected value to the online system for presenting the selected alternative number of sponsored content items in the candidate feed. For example, as described above in conjunction with FIG. 2, the online system 140 ranks sponsored content items eligible be presented to the user based on expected values of the sponsored content items and selects the alternative number of sponsored content items based on the ranking. As an example, the alternative number of sponsored content items is six, so the online system 140 selects sponsored content items having the top six positions in the ranking based on expected values. The preceding example allows the online system 140 to select sponsored content items most likely to be included in the candidate feed. In another example where the online system 140 includes sponsored content items and organic content items in a unified ranking, the online system 140 selects the alternative number of sponsored content items having highest positions in the unified ranking.

Based on expected values of the selected sponsored content items, the online system 140 determines an average expected value to the online system 140 for including the alternative number of sponsored content items in the candidate feed of content. Additionally, the online system 140 determines a historical average amount of compensation received from the user from sponsored content items previously presented to the user via feeds of content generated by the online system 140. For example, the online system 140 determines amounts of compensation received from presenting sponsored content items to the user within a specific time interval and determines an average amount of compensation based on the total amount of compensation received from presenting sponsored content items during the specific time interval and a number of sponsored content items presented to the user within the specific time interval. In various embodiments, the online system 140 determines the value to the online system 140 of presenting a feed of content including one or more sponsored content items that violate one or more of the content policies Based on a comparison of the average expected value to the online system 140 for presenting the alternative number of sponsored content items in the candidate feed of content and the historical average amount of compensation received from the user, the online system 140 determines whether to relax one or more of the content policies when generating the candidate feed of content. In one embodiment, the online system 140 determines a ratio of the average expected value to the online system 140 for presenting the alternative number of sponsored content items in the candidate feed of content to the historical average amount of compensation received from the user. If the ratio exceeds a threshold, the online system 140 relaxes one or more content policies so the alternative number of sponsored content items, which exceeds the number of content items that complies with one or content policies enforced 305 by the online system 140, are included in the candidate feed. As an example, if the ratio exceeds the threshold, the online system 140 decreases a number of organic content items or a number of positions separating sponsored content items in the candidate feed of content generated for the user. In some embodiments, if the ratio is less than an alternative threshold, the online system 140 modifies one or more of the enforced content policies to further decrease a number of sponsored content items included in the candidate feed of content items. Hence, the online system 140 may reduce a number of sponsored content items included in the candidate feed of content items if the radio is less than the alternative threshold. In some embodiments, the threshold value and the alternative threshold value are percentiles based on ratios for multiple users of average expected values to the online system 140 for presenting the alternative number of sponsored content items in feeds for each of multiple users and corresponding historical average amount of compensation received from each of the multiple users. The multiple users may be identified so they have at least a threshold amount of characteristics matching characteristics of the user (or have a particular characteristic matching the particular characteristic of the user).

In another embodiment, the online system 140 generates a model determining a likelihood that the user will quit the online system based on characteristics of the user and characteristics of feeds of content presented to the online system. For example, the online system 140 generates the model based on characteristics of other users who quit the online system 140, amounts of sponsored content included in feeds of content presented to the other users, characteristics of feeds of content presented to the other users (e.g., separation between sponsored content items included in feeds of content, positions of sponsored content within the feeds of content, etc.). The online system 140 applies the model to characteristics of the user and characteristics of the candidate feed of content including sponsored content items that complies with one or more content policies enforced 305 by the online system 140. If the likelihood of the user quitting the online system 140 generated by application of the model is less than a threshold value, the online system 140 relaxes one or more of the content policies, which increases a number of sponsored content items included in the candidate feed of content. In some embodiments, if the likelihood of the user quitting the online system is greater than an alternative threshold value, the online system 140 modifies one or more of the content polices to decrease the number of sponsored content items included in the candidate feed, and modifies the candidate feed accordingly to reduce the number of included sponsored content items.

In various embodiments, when determining whether a sponsored content item satisfies a threshold number of or a threshold percentage of criteria for relaxing a content policy, the online system 140 calculates a value associated with presenting the sponsored content item to the user and may relax the content policy if the calculated value equals or exceeds a threshold value. In some embodiments, the calculated value is based on a bid amount associated with the sponsored content item 410 and a likelihood of the user interacting with the sponsored content item 410. For example, the threshold value is an amount of compensation expected to be received by the online system 140 for presenting the sponsored content item 410 to the user and the calculated value is a product of the sponsored content item's bid amount and a likelihood of the user interacting with the sponsored content item 410 or a likelihood of the user performing certain interactions with the sponsored content item 410. The likelihood of the user interacting with the sponsored content item 410 or performing certain interactions with the sponsored content item may be based on a number of previous interactions by the user or by additional users having at least a threshold number or threshold percentage of characteristics matching characteristics of the user with the sponsored content item 410 or with additional sponsored content items having at least threshold measure of similarity to the sponsored content item 410. In other embodiments, the online system 140 calculates a value associated with presenting the sponsored content item 410 to the user by applying a conversion factor to one or more of the bid amount included in the sponsored content item 410 and to an expected amount of interaction by the user with the sponsored content item 410, which may be based on prior interactions with the sponsored content item 410 or with additional sponsored content items having at least a threshold number or a threshold percentage of characteristics matching characteristics of the sponsored content item 410 by the user or by additional users having at least a threshold number or a threshold percentage of characteristics matching characteristics of the user. Application of the conversion factor converts the bid amount and the expected amount of interaction into a common unit of measurement, allowing combination of the bid amount and the expected amount of interaction.

As another example, a criterion for relaxing a content policy is the value calculated for the sponsored content item 410 having at least a threshold position in a ranking of values associated with presenting a set of sponsored content items. Sponsored content items in the set may share a threshold number or a threshold percentage of characteristics with the sponsored content item. For example, the online system 140 relaxes a content policy if a value associated with the sponsored content item 410 is within a specified percentile in a ranked distribution of values associated with a set of sponsored content items previously presented to the user or to other users. In some embodiments, the value associated with the sponsored content item 410 is a predicted amount of interaction with the sponsored content item by the user and the values in the ranked distribution of values are average amounts of interaction by the user with each sponsored content item in the set of previously presented sponsored content items. For example, the online system 140 retrieves a ranked distribution of a number of interactions by the user with sponsored content items presented to the user within a particular time interval (e.g., over the past twelve months) and relaxes a content policy if the predicted amount of user interaction with the sponsored content item is in the $90^{th}$ percentile (i.e., the top 10%) of the distribution. The predicted amount of user interaction with the sponsored content item 410 may be based on a number of previous interactions by the user with additional sponsored content items having at least a threshold measure of similarity to the sponsored content item 410 (e.g., at least a threshold number of characteristics matching characteristics of the sponsored content item 410, at least a threshold percentage of characteristics matching characteristics of the sponsored content item 410).

In other embodiments, the value associated with the sponsored content item 410 is an amount of compensation received or expected to be received by the online system 140 for presenting the sponsored content item 410, which is ranked among average amounts of revenue generated from presenting various sponsored content items in a set to the user or to other users. For example, the online system 140 predicts an amount of revenue to be received by the online system 140 from presenting the sponsored content item to the user (e.g., based on a predicted amount of interaction with the sponsored content item by the user and a bid amount associated with the sponsored content item 410 specifying an amount of compensation received by the online system 140) and ranks the predicted amount of revenue in a ranked distribution of revenue earned by the online system 140 from presenting sponsored content items in a set of sponsored content items to the user, or to other users, during a specified time interval (e.g., six months from a current time). If the predicted amount of revenue has at least a threshold position in the ranked distribution of revenues earned, the online system 140 may relax one or more content policies restricting presentation of the sponsored content item 410 in certain positions of a feed of content. For example, the online system 140 relaxes a content policy for sponsored content items having a value in the ninety eighth percentile of a ranked distribution of revenue generated from a set of sponsored content items previously presented to the user. Thus, if the online system 140 predicts it will generate $1.84 from presenting the sponsored content item 410 to the user and the threshold amount of revenue for inclusion in ninety eighth percentile of the ranked distribution of revenue is $1.73, the online system 140 may relax the content policy when associating the sponsored content item 410 with a position in the candidate feed of content 400A, allowing association of the sponsored content item 410 with a position in the candidate feed of content 400A that would otherwise violate the content policy.

In yet another embodiment, a value associated with the sponsored content item 410 is based on a measure of similarity between the sponsored content item 410 and one or more sponsored content items previously presented to the user. For example, the online system 140 calculates the value for presenting the sponsored content item 410 by combining the bid amount of the sponsored content item and the expected amount of user interaction with the sponsored content item 410 (or the likelihood of the user interacting with the sponsored content item 410) and scaling the combination by a measure of similarity between the sponsored content items and one or more additional sponsored content items previously presented to the user (e.g. sponsored content items in the ninety fifth percentile of a distribution of revenue earned from sponsored content items previously presented to the user). If the value of the sponsored content item equals or exceeds a threshold value, the online system 140 may relax one or more content policies that would otherwise be applied to the sponsored content item, allowing the sponsored content item to be associated with one or more positions in the candidate feed of content 400A that would otherwise violate an content policy.

If more than one sponsored content item eligible to be presented to the user satisfies a threshold number or a threshold percentage of criteria for relaxing a content policy, the online system 140 selects a sponsored content item that satisfies the threshold criteria for inclusion in the candidate feed 400A in some embodiments. For example, if three sponsored content items eligible to be presented to the user satisfy at least the threshold number or the threshold percentage of criteria for relaxing an content policy, the online system 140 ranks the sponsored content items based on their computed values (or their bid amounts, or there expected amounts of user interaction) and selects one of the sponsored content items to associate with a position in the candidate feed of content 400A that violates a content policy based on the ranking. Alternatively, the online system 140 generates multiple candidate feeds that each include a different sponsored content item eligible for presentation to the user and satisfying at least the threshold number or the threshold percentage of criteria for relaxing a content policy associated with positions that violates a content policy.

Hence, in various embodiments, the online system 140 relaxes one or more content policies regulating placement of the sponsored content item 410 in a feed of content if the online system 140 determines the sponsored content item 410 satisfies at least a threshold number or a threshold percentage of criteria or if the online system 140 generates 325 a value indicating at least a threshold tolerance of the user for sponsored content items in a feed of content. If the online system 140 determines 330 to relax enforcement of one or more of the content policies based on the sponsored content item 410 satisfying the threshold number or threshold percentage of the criteria or based on the generated value having at least the threshold tolerance of the user for sponsored content items in the feed of content, the online system 140 generates the feed of content so the generated feed of content includes one or more sponsored content items in positions that violate one or more of the content policies, which increases an amount of sponsored content items included in the feed of content.

For example, if the online system 140 determines the sponsored content item 410 is associated with a threshold amount of predicted user interaction, the online system 140 evaluates the sponsored content item 410 along with other content items for association with a position in the feed that would otherwise cause the sponsored content item to violate one or more of the relaxed content policies. This allows the online system 140 to evaluate the sponsored content item 410 for association with the position along with other content items based on the value associated with the sponsored content item 410 and the values associated with the other content items. Hence, a sponsored content item satisfying at least the threshold number or the threshold percentage of the criteria is evaluated for association with the feed based on its value relative to values of other content items evaluated for association with the position.

If the sponsored content item 410 satisfies at least the threshold number or the threshold percentage of the criteria for relaxing an content policy, the online system 140 associates the sponsored content item 410 with a position in the candidate feed 400A that violates one or more of the relaxed content policies and computes a value associated with presenting the candidate feed 400A to the user. The online system 140 computes the value associated with presenting the candidate feed 400A to the user based on values associated with the sponsored content item 410 included in the position 405I that violates a relaxed content policy and values associated with the additional content items selected for presentation to the user in the candidate feed 400A. For example, the online system 140 computes the value associated with presenting the candidate feed 400A to the user by combining the value associated with the sponsored content item 410 included in the position 405I that violates a relaxed content policy and values associated with content items presented in other positions 405 of the candidate feed 400A. Additionally, when computing the value associated with presenting the candidate feed 400A to the user, the online system 140 reduces the value associated with the sponsored content item 410 included in the position 405I that violates a relaxed content policy by a penalty associated with violating the relaxed content policy. Hence, the online system 140 decreases the value for the sponsored content item 410 determined from its bid amount and expected amount of user interaction by the penalty. Values associated with the additional content items selected for presentation to the user in the candidate feed 400A, which are organic content items, are based on predicted amount of user interaction with each content item. If the candidate feed 400A includes additional sponsored content items associated with positions that do not violate a relaxed content policy, the online system 140 determines values for the additional sponsored content items based on their bid amounts and expected amounts of user interaction, as described above. In various embodiments, the online system 140 applies position discounts to values of the content items, the value of the sponsored content item 410 associated with a position that violates a relaxed advertising rule, and values of sponsored content items presented in positions that do not violate a relaxed advertising rule based on the positions associated with each of the preceding items, which is further described below. The value associated with the candidate feed 400A and values for the content items, for the sponsored content item 410, and for additional sponsored content items may be computed in terms of an expected amount of user interaction or in terms of expected monetary compensation.

In various embodiments, the online system 140 trains one or more machine-learned models to compute the values for sponsored content items and for content items included in a content feed based on information associated with the user (including prior interactions by the user with content items and sponsored content items) as well as information associated with the content items and the sponsored content items. Information associated with the user may include a historical amount of revenue earned by the online system 140 from presenting sponsored content items to the user and historical values associated with content items and sponsored content items previously presented to the user. Information associated with a sponsored content item 410 includes: the sponsored content item's bid amount, previous interactions of the user and other online system users with the sponsored content item 410, and an amount of revenue earned by the online system 140 for presenting the sponsored content item to users of the online system 140 during a time interval. Additional contextual information may also be used in some embodiments when computing values for sponsored content items and content items. Example contextual information includes information describing a date or a time when a sponsored content item or content item is to be presented, a type of the content item or sponsored content item, or any other suitable information.

To compute the value associated with presenting the candidate feed 400A to the user, the online system 140 computes a value of the sponsored content item 410 included in the position 405I that violates a relaxed content policy. For example, the online system 140 retrieves information describing a bid amount associated with an ad request including the sponsored content item 410 and calculates the value of the sponsored content item 410 at least in part on the bid amount. As described above in conjunction with FIG. 2, the bid amount specifies an amount of monetary compensation a publishing user provides the online system 140 in exchange for presenting the sponsored content item 410 or in exchange for users of the online system 140 presented with the sponsored content item 410 performing one or more actions. In some embodiments, the value of the sponsored content item 410 may also be based on bid amounts associated with other sponsored content items eligible for presentation to the user. For example, the value of the sponsored content item 410 may be based at least in part on one or more bid amounts of additional sponsored content items eligible for presentation to the user that are lower than the bid amount of the sponsored content item 410.

As described above, the value associated with the sponsored content item 410 may be determined as a product of the bid amount of the sponsored content item 410 and a likelihood of the user interacting with the sponsored content item 410 based on prior interactions by the user with sponsored content items having at least threshold similarity to the sponsored content item 410. The likelihood of the user interacting with the sponsored content item 410 may also be based at least in part on prior interactions with the sponsored content item 410 or with additional sponsored content items having at least a threshold similarity to the sponsored content item 410 by additional users having at least a threshold similarity to the user. For example, if the bid amount associated with the sponsored content item 410 is $1.00 and there is a 90% likelihood of the user interacting with the sponsored content item 410, the online system 140 computes a value of $0.90 for presenting the sponsored content item 410 to the user. In other embodiments, the online system 140 calculates a value associated with presenting the sponsored content item 410 to the user by applying a conversion factor to one or more of the bid amount included in the sponsored content item 410 and to an expected amount of interaction by the user with the sponsored content item 410, which may be based on prior interactions with the sponsored content item 410 or with additional sponsored content items having at least a threshold number or a threshold percentage of characteristics matching characteristics of the sponsored content item 410 by the user or by additional users having at least a threshold number or a threshold percentage of characteristics matching characteristics of the user.

In some embodiments, the online system 140 accounts for a position bias that may influence interactions with content items displayed in different positions in a content feed by applying applies position discounts to the values of content items in the candidate feed of content 400A based on the positions 405 in the candidate feed 400A associated with various content items. For example, a position discount is based on the position in which a content item is presented in a content feed relative to a reference point in the feed. The position discount associated with a position 405 in the candidate feed 400A may be based at least in part on a distance between the position 405 and a reference position in the candidate feed 400A, such as an upper boundary of the candidate feed 400A or an initial position of the candidate feed 400A (e.g., a topmost position of the candidate feed 400A). For example, different position discounts are associated with different distances from the upper boundary of the candidate feed 400A, so a distance between a position 405 and the upper boundary of the candidate feed 400A determines the position discount applied to a value associated with a content item or a sponsored content item associated with the position 405. The position discount associated with a position 405 accounts for different likelihoods of the user interacting with content items presented in different positions. Determining a position discount value associated with a position 405 in a feed of content is further described in U.S. patent application Ser. No. 14/049,429, filed on Oct. 9, 2013, and in U.S. patent application Ser. No. 14/675,009, filed on Mar. 31, 2015, which are each hereby incorporated by reference in their entirety.

Hence, the online system 140 applies a position discount corresponding to a position 405I in the candidate feed 400A associated with the sponsored content item 410 to the value of the sponsored content item 410 when computing the value for presenting the candidate feed 400A to the user. For example, if prior interactions by the user or by additional users with content items presented in position 405I cause the online system 140 to determine a position discount of 0.85 is associated with position 405I, the online system 140 applies the position discount to the value of the sponsored content item 410, which reduces the value of the sponsored content item 410. In some embodiments, the online system 140 multiplies the value of the sponsored content item 410 by the position discount corresponding to the position 405I associated with the sponsored content item 410.

Additionally, to account for a potential decrease in user engagement with the candidate feed 400A from presenting the sponsored content item 410 in a position that violates one or more content policies, the online system 140 computes a penalty incurred by the sponsored content item 410 for violating one or more of the content policies. In some embodiments, the value for the sponsored content item 410 is decreased by the penalty before a position discount is applied to the value. For example, the penalty is subtracted from the bid amount of the sponsored content item 410 or multiplied by the bid amount when computing the value for the sponsored content item 410 but before application of the position discount to the value. Alternatively, the penalty is applied to the value after the position discount is applied to the value. In other embodiments, the online system 140 adjusts the value computed for presentation of the candidate feed 400A by the penalty. For example, the penalty is subtracted from the value for presentation of the candidate feed 400A is a factor by which the value for presentation of candidate feed 400A is multiplied. In various embodiments, the penalty is based at least in part on prior interactions by the user with sponsored content items previously presented to the user (e.g., all previously presented sponsored content items, sponsored content items presented within a specified time period, or sponsored content items having at least a threshold similarity to the sponsored content item 410). For example, the online system 140 retrieves a distribution of values associated with a set of sponsored content items previously presented to the user and computes a user-specific penalty incurred by the sponsored content item 410 based on one or more properties of the distribution of values associated with the set of sponsored content items.

In some embodiments, the penalty incurred by the sponsored content item 410 is a product of a mean of a distribution of revenue generated from a set of sponsored content items previously presented to the user and a coefficient associated with a property of the distribution, such as a specific subset or percentile of the distribution. The coefficient may be a factor that yields a threshold value in the distribution of revenue when multiplied by another property of the distribution (e.g., the mean) that corresponds to one or more criteria for relaxing one or more of the content policies enforced 305 by the online system 140. Hence, in some embodiments, the magnitude of the coefficient is proportional to one or more criteria for relaxing one or more content policies. For example, if a criterion for relaxing the content policy preventing insertion of the sponsored content item 410 into the position 405I in the candidate feed 400A is a predicted amount of revenue earned from the sponsored content item 410 being in a ninety fifth percentile of a distribution of revenue generated from a set of sponsored content items previously presented to the user, where the coefficient is 1.3 when the ninety fifth percentile of the distribution is $4.68 and the mean of the distribution is $3.60.

In one embodiment, the coefficient and the penalty are directly related (e.g., proportional) to a degree to which a content policy is violated by the sponsored content item 410. For example, a larger magnitude coefficient is associated with larger violation of one or more content policies. As an example, larger coefficients are associated with smaller distances between a position including the sponsored content item 410 and a position including another sponsored content item if a content policy specifies a minimum distance between positions including sponsored content items. Thus, larger violations of one or more content policies cause the sponsored content item 410 to incur a larger penalty. In another embodiment, the coefficient and penalty are inversely related to (e.g., inversely proportional to) a frequency with which one or more content policies are violated. For example, if the online system 140 relaxes content policies less than a threshold number of times, the coefficient has a large magnitude, which increases the penalty incurred by a sponsored content item violating one or more content policies. As an additional example, if the online system 140 frequently relaxes a content policy when presenting content, a coefficient associated with violating the content policy is low, reducing the penalty incurred by a sponsored content item for violating the content policy.

In some embodiments, the online system 140 computes the penalty based on a predicted amount of interaction with the sponsored content item 410 by the user. The predicted amount of user interaction with the sponsored content item 410 may be based on a number or a percentage of interactions with additional sponsored content items having at least a threshold similarity to the sponsored content item 410 previously presented to the user or to other users of the online system 140 (e.g., all online system users or online system users having at least a threshold similarity to the user). In one embodiment, the online system 140 computes the penalty based on a difference between a predicted amount of interaction with the sponsored content item 410 by the user and amounts of interaction with sponsored content items previously presented to the user. For example, the penalty is based on a difference between a predicted amount of interaction with the sponsored content item 410 by the user and amounts of interaction by the user with previously presented sponsored content items in a specified percentile (e.g., the ninetieth percentile) of a distribution of amounts of interactions by the user with a set of previously presented sponsored content items having a threshold similarity to the sponsored content item 410.

The online system 140 may determine the penalty based at least in part on a predicted loss of user interaction with the candidate feed 400A caused by presentation of the sponsored content item 410 in a position that violates one or more of the content policies. For example, the online system 140 retrieves information describing interactions of the user with feeds of content previously presented to the user that include sponsored content items having at least a threshold similarity to the sponsored content item 410 in various positions in the feeds. The online system 140 determines differences between amounts of interaction by the user with feeds of content including the sponsored content items having at least the threshold similarity to the sponsored content item 410 in different positions and predicts a loss of user engagement with the candidate feed 400A based on the identified differences. Based on the predicted losses of user engagement between different feeds of content previously presented to the user, the online system 140 determines the penalty.

In some embodiments, the online system 140 calculates multiple penalties, with each penalty associated with different degrees of violations of a content policy. Each penalty may be based on a predicted loss of user engagement with the candidate feed 400A caused by presenting the sponsored content item 410 in different positions of the candidate feed 400A. For example, each penalty is associated with a different position violating a content policy and is based on predicted losses of user interaction from presenting the sponsored content item 410 in different positions violating the content policy. The online system 140 may select a penalty to associate with the sponsored content item 410 that maximizes the value associated with presenting the candidate feed 400A to the user.

Figure 5:
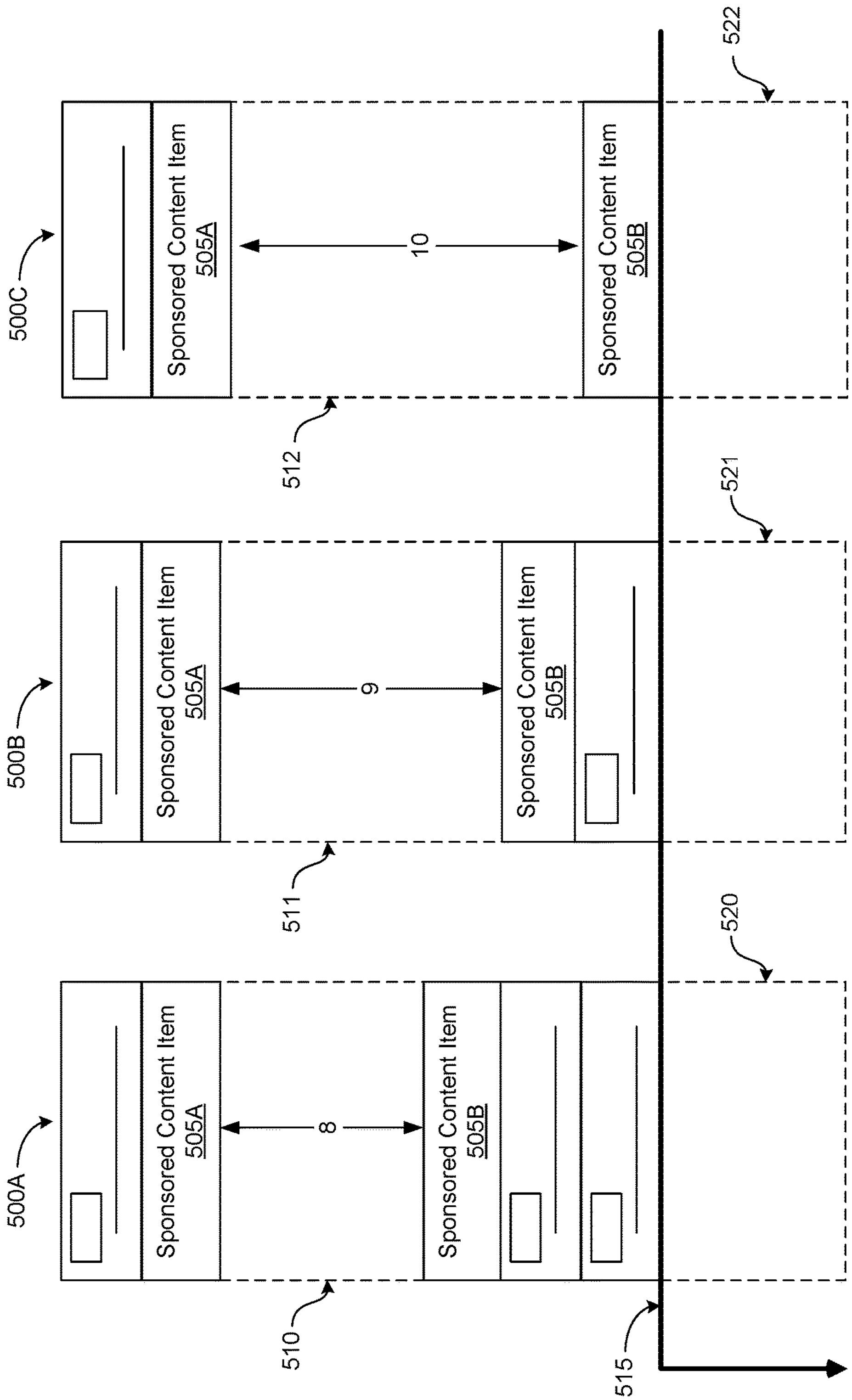
FIG. 5 is an example of calculating a penalty associated with violating a content policy based on a difference in user interaction with feeds of content each presenting a sponsored content item in different positions, in accordance with an embodiment.

In various embodiments, the online system 140 accounts for interactions by other online system users with feeds of content including a sponsored content item violating a content policy when determining a penalty for the sponsored content item based on a predicted loss of user engagement with the candidate feed 400A. For example, FIG. 5 shows an example where the online system 140 measures amounts of user interaction with different feeds of content 500A-C presented to one or more additional users of the online system 140. The one or more additional users of the online system 140 may have at least a threshold measure of similarity with the user. In some embodiments, content items and sponsored content items included in each feed of content 500A-C have at least a threshold measure of similarity with content items and sponsored content items included in the candidate feed 400A. Each feed of content 500A-C includes a sponsored content item 505B in a different position of the feed that complies with a content policy or violates the content policy to a degree. Different feeds of content 500A-C may include the sponsored content item 505B in positions that violate the content policy to different degrees. The online system 140 measures an amount of user interaction with each feed of content 500A-C and bases one or more penalties on a measured loss of user interaction between different feeds of content 500A-C.

Feed of content 500A includes a sponsored content item 505B in a position in the feed 500A that complies with content policies enforced 305 by the online system 140. For example, feed of content 500A includes two sponsored content items 505A-B that are separated from each other in the feed of content 500A by a distance 510 of ten positions, which complies with a content policy specifying a minimum of ten organic content items between consecutive sponsored content items in the feed of content 505A. In the example of FIG. 5, feed of content 505A associates organic content items with the ten positions between sponsored content item 505A and sponsored content item 505B.

However, in FIG. 5, feed of content 500B and feed of content 500C each include sponsored content item 505B in a position where fewer than 10 organic content items are presented between sponsored content item 505A and sponsored content item 505B. Content feed 500B in FIG. 5 includes sponsored content item 505A and associates sponsored content item 505B with a position separated from a position associated with sponsored content item 505A by a distance 511 of nine positions, which violates the content policy by one position. Similarly, in FIG. 5, content feed 500C includes sponsored content item 505A and associates sponsored content item 505B with a position separated from a position associated with sponsored content item 505A by a distance 512 of eight positions, which violates the content policy by two positions.

Each feed of content 500A-C includes a common reference point 515, and the online system 140 measures user engagement with content items presented in positions that are lower than the reference point 515. The order in which content items are presented in positions above the reference point 515 is affected by the positions associated with the sponsored content items 505A-B included in the various feeds of content 500A-C. For example, if sponsored content item 505B in feed of content 500A is presented one position nearer to an initial position in feed of content 500A, an organic content item presented nearer to the initial position in feed of content 500A is displaced and presented one position farther from the initial position in feed of content 500A, resulting in feed of content 500B. Similarly, presenting sponsored content item 505B two positions nearer to the initial position in feed of content 500A displaces two organic content items so they are presented two positions farther from the initial position in feed of content 500A, resulting in feed of content 500C. However, the order in which content items presented below the reference point 515 in each of feeds of content 500A-C is not affected by the order of the content items above the reference point 515. Hence, content items 520 below the reference point 515 in feed of content 500A, content items 521 below the reference point 515 in feed of content 500B, and content items 522 below the reference point 515 in feed of content 500C have the same order in each of feed of content 500A-C. Hence, determining amounts of user interaction with content items 520, content items 521, and content items 522 in feed of content 500A, feed of content 500B, and feed of content 500C, respectively, allows the online system 140 to determine differences in user engagement between the feeds of content 500A-C caused by presentation of sponsored content item 500B in positions that differently violate the content policy.

The online system 140 computes a value for each of feed of content 500A, feed of content 500B, and feed of content 500C based on user interactions with, respectively, content items 520, content items 521, and content items 522, which are presented below the reference point 515. User interactions include: accessing a content item, sharing a content item with another user, commenting on a comment item, indicating a preference for a content item, request additional information associated with a content item, establish a connection with an object associated with a content item, or any other suitable interaction. Different user interactions with content items presented below the reference point 515 may be differently weighted when computing the value for each feed of content 500A-C. For example, a user sharing a content item presented below the reference point 515 in a feed of content 500A-C with another user of the online system 140 may be associated with a greater weight than a user accessing the content item presented below the reference point 515.

The online system 140 compares the computed values for each feed of content 500A-C and determines a loss of user engagement between different feeds of content 500A-C based on the values for each feed of content 500A-C. As feed of content 500A presents sponsored content item 505B in a position that complies with the content policy, the value of the first feed of content 500A provides a baseline against which values for feed of content 500B and feed of content 500C are compared. A difference between a value for feed of content 500B, which presents sponsored content item 505B in a position that violates the content policy by one position, and the value for feed of content 500A is used by the online system 140 to determine a penalty for presenting a sponsored content item in a position that violates the content policy by one position. Similarly, a difference between a value for feed of content 500C, which presents sponsored content item 505B in a position that violates the content policy by two positions, and the value for feed of content 500A is used by the online system 140 to determine a penalty for presenting a sponsored content item in a position that violates the content policy by two positions. Values for feeds of content 500B-C may reflect a decrease in user engagement with feeds of content 500B-C from presenting the second sponsored content item 505B in positions violating the content policy, which displaces one or more organic content items into less visible positions in feeds of content 500B-C. Displacing the organic content items causes additional navigation through the feeds of content 500B, 500C to access the organic content items, decreasing user interactions with the displaced organic content items.

Based on differences in interaction between feed of content 500A and feed of content 500B as well as between feed of content 500A and feed of content 500C, the online system 140 determines penalties for presenting a sponsored content item in positions that violate the example content policy described in conjunction with FIG. 5. The determined penalties are used by the online system 140 to reduce values for presenting sponsored content items that violate the example content policy described in conjunction with FIG. 5 by different degrees. Determining different penalties associated with different degrees by which a content policy is violated allows the online system 140 to more accurately account for changes in user interaction with content feeds when a sponsored content item in a feed is presented in positions that differently violate an content policy.

When computing the value of presenting the candidate content feed 400A to the user, values associated with organic content items in the candidate feed 400A are determined based on a predicted amount of user interaction with each content item in the candidate feed 400A. The online system 140 applies a position discount corresponding to a position 405A-H, 405J in the candidate content feed 400A associated with an organic content item to the value associated with the organic content item. Similarly, the online system 140 determines values for additional sponsored content items in the candidate content feed 400A, where a value associated with a sponsored content item associated with a position 405 that does not violate one or more content policies is based on expected user interaction with the sponsored content item and a bid amount associated with the sponsored content item. The online system applies a position discount corresponding to a position 405 in the candidate content feed 400A associated with the sponsored content item when computing the value of presenting the candidate content feed 400A to the user.

In various embodiments, the online system 140 determines expected amounts of interactions with organic content items and sponsored content items based on information stored by the online system 140 describing previous interactions by the user or by additional users having at least at threshold similarity to the user with the content items or sponsored content items or with additional content items or additional sponsored content items having at least a threshold measure of similarity with the content items or the sponsored content items. For example, a value associated with a particular organic content item is based on a number of times or a frequency with which the user views or interacts with content items having a threshold number or a threshold percentage of characteristics matching characteristics of the organic content item. Position discounts are applied to the values for the organic content items and sponsored content items in the candidate feed of content 400A corresponding to the positions in the candidate feed of content items 400A associated with the organic content items and sponsored content items, and the online system 140 combines the values after application of the position discounts to compute the value for presenting the candidate feed of content 400A to the user.

In some embodiments, the online system 140 generates an alternative candidate feed of content including the content items that are included in the candidate feed of content but has the sponsored content item associated with a position that does not violate the content policy. FIG. 4 shows an example alternative candidate feed 400B that includes the sponsored content item 410 in a position 405J that complies with the content policy enforced 305 by the online system 140. In the example of FIG. 4, the alternative candidate feed of content 400B includes the same content items as the candidate feed of content 400A, so the content items in the alternative candidate feed of content 400B are associated with positions 405A-J in the alternative candidate feed 400B that are similar to the positions 405A-J associated with the content items in the candidate feed of content 400A. However, the alternative candidate feed of content 400B associates the sponsored content item 410 with a position 405J that complies with the content policy violated by the position 405I associated with the sponsored content item 410A in the candidate feed 400A. For example, position 405J is a tenth position in the alternative candidate feed of content 400B, so the sponsored content item 410 is associated with a position that complies with the content policy enforced 305 by the online system 140 preventing presentation of a sponsored content item within the first nine positions 405A-J in a feed of content that includes organic content.

The online system 140 computes an additional value associated with the alternative candidate feed of content 400B based on values determined for organic content items in the alternative candidate feed of content 400B, values determined for sponsored content items in the alternative candidate feed of content 400B, and a value determined for the sponsored content item 410. As described above, values determined for the sponsored content item 410 and for additional sponsored content items are based on bid amounts associated with the sponsored content item 410 and with the additional sponsored content items as well as expected interaction by the user with the sponsored content item 410 and with the additional sponsored content items. For example, the value associated with the sponsored content item 410 is based on a bid amount associated with the sponsored content item 410 and an expected amount of interaction by the user with the sponsored content item 410. Also as described above, values for organic content items in the alternative candidate feed of content 400B are determined based on expected interaction by the user with the organic content items. In various embodiments, the online system 410 applies position discounts to the values of content items and sponsored content items in the alternative candidate feed of content 400B corresponding to the positions in the alternative candidate feed of content 400B associated with the content items and the sponsored content items and combines the values after application of the position discount to compute the additional value associated with the alternative candidate feed of content 400B. As the alternative candidate feed of content 400B associates the sponsored content item 410 with a position that complies with the content policy, no penalty is applied to the value associated with the sponsored content item 410 or is applied to the additional value associated with the alternative candidate feed of content 400B.

After the online system 140 computes the value associated with the candidate feed of content 400A and computes the additional value associated with the alternative candidate feed of content 400B, the online system 140 compares the value and the additional value and selects the candidate feed of content 400A or the alternative candidate feed of content 400B based on the comparison. In various embodiments, the online system 140 determines which of the value and the additional value is larger and selects the feed of content from the candidate feed of content 400A and the alternative feed of content 400B associated with the larger of the value and the additional value. Alternatively, the online system 140 compares the value for the sponsored content item 410 included in the candidate feed of content 400A, after applying the penalty to the value, and the value for the sponsored content item 410 included in the alternative candidate feed of content 400B and selects a feed of content in which the sponsored content item 410 has a greater value from the candidate feed 400A and the alternative candidate feed 400B.

In response to determining 330 to relax the one or more content policies, the online system 140 sends 335 the feed of content, including one or more sponsored content items in positions violating one or more of the content policies, to a client device 110 for presentation to the user. Hence, the feed of content sent 335 to a client device 110 for presentation includes the sponsored content item 410 in a position violating a content policy enforced by the online system 140 if the online system 140 determined 330 to relax one or more of the content policies based on the sponsored content item 410 or based on characteristics of the user. Relaxing one or more content policies allows the online system 140 to present the user with the sponsored content item 410 associated with a position that violates a content policy but results in a greater expected amount of interaction with a feed of content by the user or results in a greater expected amount of compensation to the online system 140. However, if the online system 140 does not determine 335 to relax one or more content policies, the online system 140 sends 335 the feed of content to the client device 110 with the sponsored content item 410 in a position that complies with the content policies enforced 305 by the online system 140, so the online system 140 enforces 305 the one or more content policies to provide the user with a feed of content with which the user is more likely to interact.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

enforcing, by a processor in an online system, a content policy, the content policy preventing insertion of sponsored content items into a top row in a feed of content, the content policy further describing a minimum number of organic content items positioned between sponsored content items;

receiving, by the processor, information describing one or more sponsored content items from one or more publishing users, each sponsored content item including content and a bid amount;

receiving, by the processor and from a client device, a request to present a feed of content to a user of the online system, the feed of content including one or more sponsored content items and a plurality of organic content items;

retrieving, by the processor and from an action log, characteristics of the user maintained by the online system, the retrieved characteristics comprising a historical rate at which the user performed one or more actions with previously presented sponsored content items;

generating, by the processor, a value indicating a tolerance of the user for sponsored content items included in the feed of content based on the retrieved characteristics;

ranking, by the processor, the value of the tolerance of the user relative to values for tolerances of other users;

mapping, by the processor, different positions in the ranking with different minimum numbers of organic content items positioned between sponsored content items;

selecting, by the processor and based on the mapping, a decreased minimum number of organic content items positioned between sponsored content items;

determining, by the processor, to relax enforcement of the content policy based on the generated value;

generating, by the processor and in response to the determining to relax enforcement of the content policy, the feed of content including a first sponsored content item in the top row of the feed of content, and a second sponsored content item separated from the first sponsored content item by the decreased minimum number of organic content items; and sending, by the processor, the generated feed to the client device for presentation to the user on the client device.

2. The method of claim 1, wherein a position that violates the content policy is less than a threshold distance from a position in the generated feed including an additional sponsored content item.

3. The method of claim 1, wherein generating the value indicating the tolerance of the user for sponsored content items included in the feed of content based on the retrieved characteristics comprises:

applying a model generated for the user determining the value indicating the tolerance of the user for sponsored content items included in the feed of content to retrieved characteristics.

4. The method of claim 3, wherein the model is generated based on indications of preference between content items received from the user in response to surveys presented by the online system to the user that identify content items.

5. The method of claim 4, wherein the model is further generated based on a historical rate at which the user performed one or more actions with sponsored content items previously presented to the user determined from the retrieved characteristics of the user.

6. The method of claim 3, wherein the model is generated based on indications of preference between content items received from a set of users in response to surveys presented by the online system to users of the set that identify content items.

7. The method of claim 6, wherein users of the set have at least a threshold amount of characteristics matching characteristics of the user.

8. The method of claim 3, wherein determining to relax enforcement of one or more of the content policies based on the generated value comprises:

determining values indicating tolerances of additional users for sponsored content items included in feeds of content based on characteristics of the additional users;

ranking the generated value relative to the determined values;

obtaining a mapping between relaxation of one or more content policies based on positions in the ranking; and determining to relax enforcement of one or more of the content policies based on the ranking and the obtained mapping.

9. The method of claim 8, wherein the mapping associates different minimum distances between sponsored content items in the feed of content with different positions in the ranking.

10. The method of claim 1, wherein generating the value indicating the tolerance of the user for sponsored content items included in the feed of content based on the retrieved characteristics comprises:

determining a number of sponsored content items for inclusion in the feed that violates the content policy;

selecting the number of sponsored content items from the received information describing one or more sponsored content items based on bid amounts included in sponsored content items;

determining an average expected value to the online system from including the selected number of sponsored content items in the feed of content;

determining a historical average amount of compensation the online system received from prior presentation of sponsored content items to the user from the retrieved characteristics; and determining to relax the content policy based on a comparison of the average expected value to the historical average amount of compensation.

11. The method of claim 10, wherein determining to relax the content policy based on the comparison of the average expected value to the historical average amount of compensation comprises:

determining a ratio of the average expected value to the historical average amount of compensation; and determining to relax the content policy in response to the ratio exceeding a threshold.

12. The method of claim 1, wherein generating the value indicating a tolerance of the user for sponsored content items included in the feed of content based on the retrieved characteristics comprises:

generating a likelihood that the user will perform an action in the online system based on application of a model to characteristics of the user and characteristics of the feed of content; and relaxing one or more of the content policies in response to the likelihood being less than a threshold.

13. The method of claim 12, further comprising:

modifying the content policy to decrease a number of sponsored content items included in the feed of content in response to the likelihood being greater than an alternative threshold; and generating the feed of content to include a decreased number of sponsored content items to comply with the modified content policy.

14. A computer program product comprising a computer readable storage medium having instructions encoded thereon that, when executed by a processor in an online system, cause the processor to:

enforce, by the processor, a content policy, the content policy preventing insertion of sponsored content items into a top row in a feed of content, the content policy further describing a minimum number of organic content items positioned between sponsored content items;

receive, by the processor, information describing one or more sponsored content items from one or more publishing users, each sponsored content item including content and a bid amount;

receive, by the processor and from a client device, a request to present a feed of content to a user of the online system, the feed of content including one or more sponsored content items and a plurality of organic content items;

retrieve, by the processor and from an action log, characteristics of the user maintained by the online system, the retrieved characteristics comprising a historical rate at which the user performed one or more actions with previously presented sponsored content items;

generate, by the processor, a value indicating a tolerance of the user for sponsored content items included in the feed of content based on the retrieved characteristics;

rank, by the processor, the value of the tolerance of the user relative to values for tolerances of other users;

map, by the processor, different positions in the ranking with different minimum numbers of organic content items positioned between sponsored content items;

select, by the processor and based on the mapping, a decreased minimum number of organic content items positioned between sponsored content items;

determine, by the processor, to relax enforcement of the content policy based on the generated value;

generate, by the processor and in response to the determining to relax enforcement of the content policy, the feed of content including a first sponsored content item in the top row of the feed of content, and a second sponsored content item separated from the first sponsored content item by the decreased minimum number of organic content items; and send, by the processor, the generated feed to the client device for presentation to the user on the client device.

15. The computer program product of claim 14, wherein a position that violates the content policy is less than a threshold distance from a position in the generated feed including an additional sponsored content item.

16. The computer program product of claim 14, wherein generate the value indicating the tolerance of the user for sponsored content items included in the feed of content based on the retrieved characteristics comprises:

apply a model generated for the user determining the value indicating the tolerance of the user for sponsored content items included in the feed of content to retrieved characteristics.

17. The computer program product of claim 16, wherein the model is generated based on indications of preference between content items received from the user in response to surveys presented by the online system to the user that identify content items.

18. The computer program product of claim 17, wherein determine to relax enforcement of the content policy based on the generated value comprises:

determine values indicating tolerances of additional users for sponsored content items included in feeds of content based on characteristics of the additional users;

rank the generated value relative to the determined values;

obtain a mapping between relaxation of the content policy based on positions in the ranking; and determine to relax enforcement of the content policy based on the ranking and the obtained mapping.

19. The computer program product of claim 14, wherein generate the value indicating the tolerance of the user for sponsored content items included in the feed of content based on the retrieved characteristics comprises:

determine a number of sponsored content items for inclusion in the feed that violates the content policy;

select the number of sponsored content items from the received information describing one or more sponsored content items based on bid amounts included in sponsored content items;

determine an average expected value to the online system from including the selected number of sponsored content items in the feed of content;

determine a historical average amount of compensation the online system received from prior presentation of sponsored content items to the user from the retrieved characteristics; and determine to relax the content policy based on a comparison of the average expected value to the historical average amount of compensation.

20. The computer program product of claim 14, wherein generate the value indicating a tolerance of the user for sponsored content items included in the feed of content based on the retrieved characteristics comprises:

generate a likelihood that the user will perform an action in the online system based on application of a model to characteristics of the user and characteristics of the feed of content; and relax the content policy in response to the likelihood being less than a threshold.

* * * * *